United States Patent
Hunzinger

(10) Patent No.: US 8,559,957 B2
(45) Date of Patent: Oct. 15, 2013

(54) METHOD AND APPARATUS FOR BIASING A HANDOFF DECISION BASED ON A BLACKHAUL LINK

(75) Inventor: Jason Frank Hunzinger, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 13/012,049

(22) Filed: Jan. 24, 2011

(65) Prior Publication Data

US 2012/0028627 A1 Feb. 2, 2012

Related U.S. Application Data

(60) Provisional application No. 61/299,289, filed on Jan. 28, 2010.

(51) Int. Cl.
- H04B 3/36 (2006.01)
- H04B 17/00 (2006.01)
- H04W 4/00 (2009.01)
- H04W 36/00 (2009.01)
- H04J 1/10 (2006.01)

(52) U.S. Cl.
USPC ......... 455/437; 455/7; 455/67.11; 455/422.1; 455/438; 455/445; 370/315; 370/331

(58) Field of Classification Search
USPC ............. 455/7–10, 67.11, 88, 422.1, 434, 455/436–451, 453, 500, 550.1, 561, 562.1, 455/41.2, 423–425, 517, 522; 370/252, 370/285, 293, 310, 315, 328, 330–338, 246, 370/274, 279, 492, 501
See application file for complete search history.

(56) References Cited

U.S. PATENT DOCUMENTS

| | | | |
|---|---|---|---|
| 2009/0264123 A1 | 10/2009 | Agashe et al. | |
| 2010/0077274 A1* | 3/2010 | Kim et al. | 714/750 |
| 2010/0142433 A1* | 6/2010 | Womack et al. | 370/315 |
| 2010/0291935 A1* | 11/2010 | Rudrapatna et al. | 455/450 |
| 2011/0051654 A1* | 3/2011 | Blankenship et al. | 370/315 |
| 2011/0081903 A1* | 4/2011 | Cai et al. | 455/424 |

FOREIGN PATENT DOCUMENTS

EP 2306766 A1 4/2011

OTHER PUBLICATIONS

International Search Report and Written Opinion—PCT/US2011/023064—ISA/EPO—May 24, 2011.

(Continued)

*Primary Examiner* — Meless Zewdu
(74) *Attorney, Agent, or Firm* — Darren M. Simon

(57) ABSTRACT

A decision whether to perform a handover between a relay and a base station may depend, at least in part, on a backhaul link between the relay and the donor base station serving the relay. That is, the relay may provide information relating to a characteristic of the backhaul link to the user equipment, and the user equipment may utilize this information to bias its measurements of signals transmitted from the relay and the base station in accordance with the characteristic of the backhaul link. In this way, if the backhaul link suffers such that it becomes a bottleneck, the handover decision between the relay and the base station is better informed than a decision based solely on the transmissions from the relay and from the base station.

17 Claims, 11 Drawing Sheets

(56) References Cited

OTHER PUBLICATIONS

Research in Motion et al: "Serving Cell Selection in a Type 1 Relay Network", 3GPP Draft; R2-100409, 3rd Generation Partnership Project (3GPP), Mobile Competence Centre; 650, Route Des Lucioles; F-06921 Sophia-Antipolis Cedex; France, vol. RAN WG2, no. Valencia, Spain; 20100118, XP050421067, [retrieved on Jan. 12, 2010].

Sharp: "Importance of Backhaul in Relay Handover", 3GPP Draft; R2-100169, 3rd Generation Partnership Project (3GPP), Mobile Competence Centre ; 650, Route Des Lucioles ; F-06921 Sophia-Antipolis Cedex ; France, vol. RAN WG2, no. Valencia, Spain; 20100118, XP050420951, [retrieved on Jan. 12, 2010].

* cited by examiner

METHOD AND APPARATUS FOR BIASING A HANDOFF DECISION BASED ON A BLACKHAUL LINK

CROSS-REFERENCE TO RELATED APPLICATION(S)

This application claims the benefit of U.S. Provisional Patent Application No. 61/299,289, entitled "METHOD AND APPARATUS FOR HANDOFF IN WIRELESS COMMUNICATIONS," filed Jan. 28, 2010, which is expressly incorporated by reference herein in its entirety.

BACKGROUND

1. Field

Aspects of the present disclosure relate generally to wireless communication systems, and more particularly, to handoffs involving a relay in a wireless communication system.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to standards such as those published and maintained by the third generation partnership project (3GPP), 3GPP2, and/or the institute of electrical and electronic engineers (IEEE), such as universal mobile telecommunication systems (UMTS), long term evolution (LTE), cdma2000, ultra mobile broadband (UMB), WiMAX, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A decision whether to perform a handover between a relay and a base station may depend, at least in part, on a backhaul link between the relay and the donor base station serving the relay. That is, the relay may provide information relating to a characteristic of the backhaul link to the user equipment, and the user equipment may utilize this information to bias its measurements of signals transmitted from the relay and the base station in accordance with the characteristic of the backhaul link. In this way, if the backhaul link suffers such that it becomes a bottleneck, the handover decision between the relay and the base station is better informed than a decision based solely on the transmissions from the relay and from the base station.

In one aspect, the disclosure provides a method of wireless communication, which includes establishing a backhaul link between a relay and a donor base station, and providing from the relay to a UE information relating to a characteristic of the backhaul link. Another aspect of the disclosure provides a method of wireless communication, which includes determining a characteristic of a relay access link between a relay and a UE, receiving information relating to a characteristic of a backhaul link between the relay and a donor base station, and providing an event report relating to a handoff to or from the relay, wherein the event report depends at least in part on the characteristic of the relay access link and the characteristic of the backhaul link.

Still another aspect of the disclosure provides an apparatus for wireless communication, including means for establishing a backhaul link between a relay and a donor base station, and means for providing from the relay to a UE information relating to a characteristic of the backhaul link. Yet another aspect of the disclosure provides an apparatus for wireless communication, which includes means for determining a characteristic of a relay access link between a relay and a UE, means for receiving information relating to a characteristic of a backhaul link between the relay and a donor base station, and means for providing an event report relating to a handoff to or from the relay, wherein the event report depends at least in part on the characteristic of the relay access link and the characteristic of the backhaul link.

Another aspect of the disclosure provides a computer program product including a computer-readable medium having code for establishing a backhaul link between a relay and a donor base station, and code for providing from the relay to a UE information relating to a characteristic of the backhaul link. Another aspect of the disclosure provides a computer program product including a computer-readable medium having code for determining a characteristic of a relay access link between a relay and a UE, code for receiving information relating to a characteristic of a backhaul link between the relay and a donor base station, and code for providing an event report relating to a handoff to or from the relay, wherein the event report depends at least in part on the characteristic of the relay access link and the characteristic of the backhaul link.

Another aspect of the disclosure provides an apparatus for wireless communication, including at least one processor and a memory coupled to the at least one processor. Here, the at least one processor is configured to establish a backhaul link between a relay and a donor base station and provide from the relay to a UE information relating to a characteristic of the backhaul link. Another aspect of the disclosure provides an apparatus for wireless communication, including at least one processor and a memory coupled to the at least one processor, wherein the at least one processor is configured to determine a characteristic of a relay access link between a relay and a UE, to receive information relating to a characteristic of a backhaul link between the relay and a donor base station, and to provide an event report relating to a handoff to or from the relay, wherein the event report depends at least in part on the characteristic of the relay access link and the characteristic of the backhaul link.

These and other aspects of the invention will become more fully understood upon a review of the detailed description, which follows.

DETAILED DESCRIPTION

Figure 1:
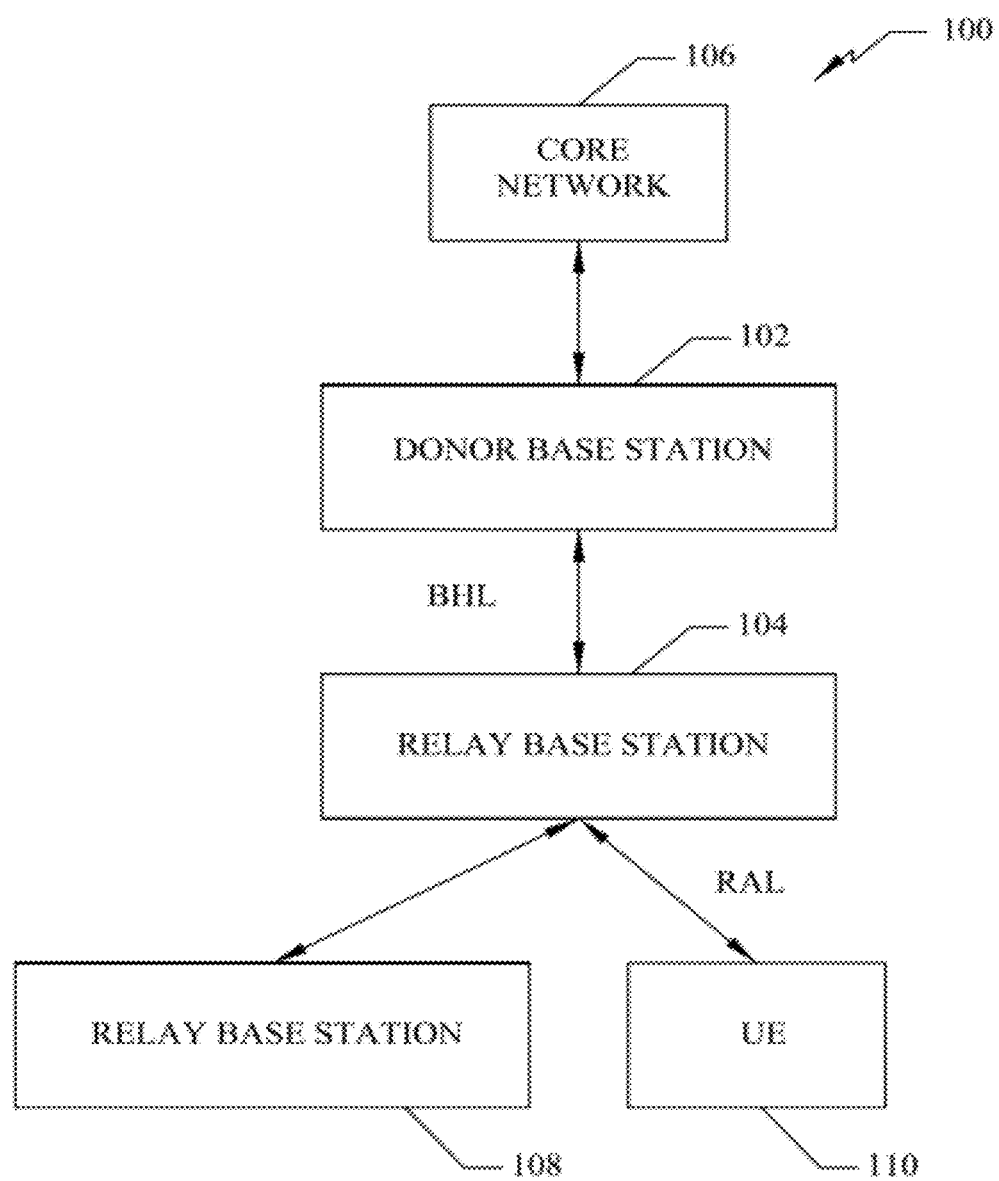
FIG. 1 is a simplified block diagram illustrating a wireless communications system utilizing at least one relay.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 that facilitates providing relay functionality in wireless networks, is illustrated. System 100 includes a donor eNB 102 that provides one or more relay eNBs, such as relay eNB 104, with access to a core network 106. Similarly, relay eNB 104 can provide one or more disparate relay eNBs, such as relay eNB 104, or UEs, such as UE 110, with access to the core network 106 via donor eNB 102. Donor eNB 102, which can also be referred to as a cluster eNB, can communicate with the core network 106 over a wired or wireless backhaul link, which can be any suitable technology backhaul link. In one example, the core network 106 can be a 3GPP evolved packet core (EPC) or similar technology network. Donor eNB 102 may provide a wireless backhaul link (BHL) for relay eNB 104, which can also be LTE or other suitable air interface, and the relay eNB 104 can communicate with the donor eNB 102 using the wireless BHL. The relay eNB 104 can similarly provide a wireless access link for one or more disparate relay eNBs 108, which can be an LTE or other technology link. In one example, donor eNB 102 can provide an LTE wireless backhaul link BHL, to which relay eNB 104 can connect, and relay eNB 104 can provide an LTE wireless relay access link (RAL) to one or more disparate relay eNBs 108 and/or one or more UEs 110. Donor eNB 102 can connect to the core network 106 over a suitable wired or wireless backhaul technology. The one or more disparate relay eNBs 108 and/or the UE 110 can connect to the relay eNB 104 using the LTE wireless access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer) as would a UE in conventional LTE configurations. In this regard, donor eNB 102 can be a conventional LTE eNB requiring no changes at the link layer or related interface (e.g., E-UTRA-Uu) to support the relay eNB 104. In addition, relay eNB 104 can appear to UE 110 as a conventional eNB at the link layer, such that no changes are required for UE 110 to connect to relay eNB 104 at the link layer, for example. In addition, relay eNB 104 can configure procedures for resource partitioning between access and backhaul link, interference management, idle mode cell selection for a cluster, and/or the like.

With respect to transport layer communications, transport protocols related to relay eNB 108 or UE 110 communications can terminate at the donor eNB 102 or relay eNB 104. In the former case, relay eNB 104 functionality is described herein as a cell relay, since the relay eNB 104 is like a cell of the donor eNB 102. In the latter case, relay eNB 104 functionality is described herein as a UE relay, since the relay eNB 104 is like a UE terminating the transport protocol and tunneling communications through the donor eNB 102. For example, when relay eNB 104 is a cell relay, donor eNB 102 can receive communications for the relay eNB 104 from the core network 106, terminate the transport protocol, and forward the communications to the relay eNB 104 over a disparate transport layer keeping the application layer substantially intact. It is to be appreciated that the forwarding transport protocol type can be the same as the terminated transport protocol type, but is a different transport layer established with the relay eNB 104. Relay eNB 104 can determine a relay eNB or UE related to the communications, and provide the communications to the relay eNB or UE (e.g., based on an identifier thereof within the communications). Similarly, donor eNB 102 can terminate the transport layer protocol for communications received from relay eNB 104, translate the communications to a disparate transport protocol, and transmit the communications over the disparate transport protocol to the core network 106 with the application layer intact for relay eNB 104 as a cell relay. In these examples, where relay eNB 104 is communicating with another relay eNB, the relay eNB 104 can support application protocol routing to ensure communications reach the correct relay eNB.

In another example, relay eNB 104 can terminate the transport layer protocol where the relay eNB 104 is a UE relay. In this example, the relay eNB 104 can be assigned an address (e.g., internet protocol (IP) address) from the core network 106, and the communications from the core network 106 can be tunneled through the donor eNB 102 to the relay eNB 104 (e.g., the donor eNB 102 can forward the communications to the relay eNB 104 based on the address). Relay eNB 104, again, can determine a relay eNB or UE to which the communications relate and provide the communications to the relay eNB or UE (e.g., based on an identifier thereof in the communications). The same can occur for communications from the relay eNB 104 to the core network 106. It is to be appreciated that at each relay eNB, an additional tunnel can be created based on an address assigned by the core network 106.

Moreover, application layer protocols can terminate at upstream eNBs. Thus, for example, application layer protocols for relay eNB 108 and UE 110 can terminate at relay eNB 104, and similarly for relay eNB 104 can terminate at donor eNB 102. The transport and application layer protocols, for example, can relate to S1-U, S1-MME, and/or X2 interfaces. The S1-U interface can be utilized to communicate in a data plane between a node and a serving gateway (not shown) of the core network 106. The S1-MME interface can be utilized for control plane communications between a node and a mobility management entity (MME) (not shown) of the core network 106. The X2 interface can be utilized for communications between eNBs. In addition, for example, donor eNB 102 can communicate with other relay eNBs to allow communications therebetween over the access network (e.g., relay eNB 104 can communicate with one or more additional relay eNBs connected to donor eNB 102).

Figure 2:
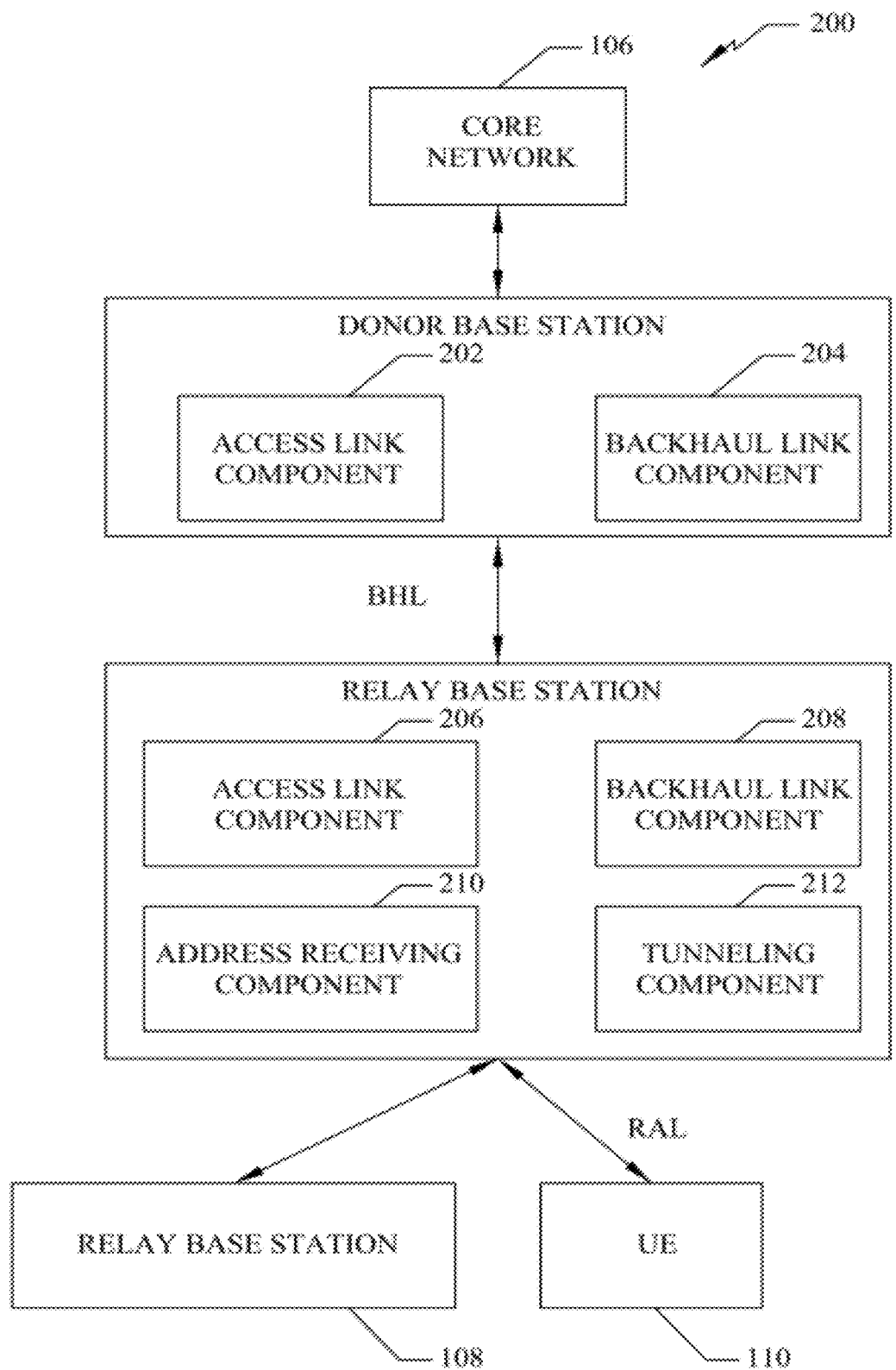
FIG. 2 is a block diagram illustrating the wireless communications system of FIG. 1, with additional sub-blocks shown for further detail.

Turning now to FIG. 2, an example wireless communication system 200 that facilitates using a UE relay to expand wireless network coverage, increase throughput, and/or the like, is illustrated. System 200 includes a donor eNB 102 that provides relay eNB 104 (and/or other relay eNBs) with access to a core network 106. Additionally, as described, relay eNB 104 can provide relay eNB 108 and/or UE 110 with access to the core network 106 through the donor eNB 102. In addition, it is to be appreciated that relay eNB 108 can comprise the components of relay eNB 104 and provide similar functionality, in one example. In addition, donor eNB 102 can be a macrocell access point, femtocell access point, picocell access point, mobile base station, and/or the like. The relay eNB 104 can similarly be a mobile or stationary relay node that communicates with donor eNB 102 over a wireless or wired backhaul, as described.

Donor eNB 102 includes an access link component 202 that communicates with one or more downstream nodes, such as relay eNB 104 to provide access to core network 106 and a backhaul link component 204 that communicates with an upstream node, such as one or more components of core network 106, to provide access thereto. Relay eNB 104 similarly includes an access link component 206 that communicates with one or more downstream nodes to provide access to core network 106 through the donor eNB 102 and a backhaul link component 208 that communicates with the donor eNB to provide the access to the core network 106. In addition, relay eNB 104 can include an address receiving component 210 that obtains a network address, such as an IP address, from one or more components of the core network 106 and a tunneling component 212 that establishes a communications tunnel with the core network 106 based on the network address.

According to an example, relay eNB 104 can establish communications with donor eNB 102 to receive access to the core network 106. In this example, relay eNB 104 can communicate with the donor eNB 102 over its backhaul link component 208, which can provide a wired or wireless link to the access link component 202 of donor eNB 102. In one example, backhaul link component 208 can communicate with the donor eNB 102 using an air interface (such as an LTE air interface). As described, the backhaul link can be an LTE backhaul link, in one example. Donor eNB 102 can communicate with the core network 106 using its backhaul link component 204 to request access for the relay eNB 104. Core network 106 can include one or more components (not shown) to authenticate/authorize the relay eNB 104, such as an MME, policy and charging rules function (PCRF), one or more gateways, and/or the like. Core network 106, and/or one or more components thereof, can assign a network address to the relay eNB 104 and communicate the address to the donor eNB 102 over the backhaul link component 204. Donor eNB 102 can forward the network address communication to the relay eNB 104 over the access link component 202, and backhaul link component 208 can receive the communication. Address receiving component 210 can extract the address from the communication for subsequent use in communicating with the core network 106 via donor eNB 102. This can support mobility for the relay eNB 104, in one example, to seamlessly communicate between multiple donor eNBs.

Figure 3:
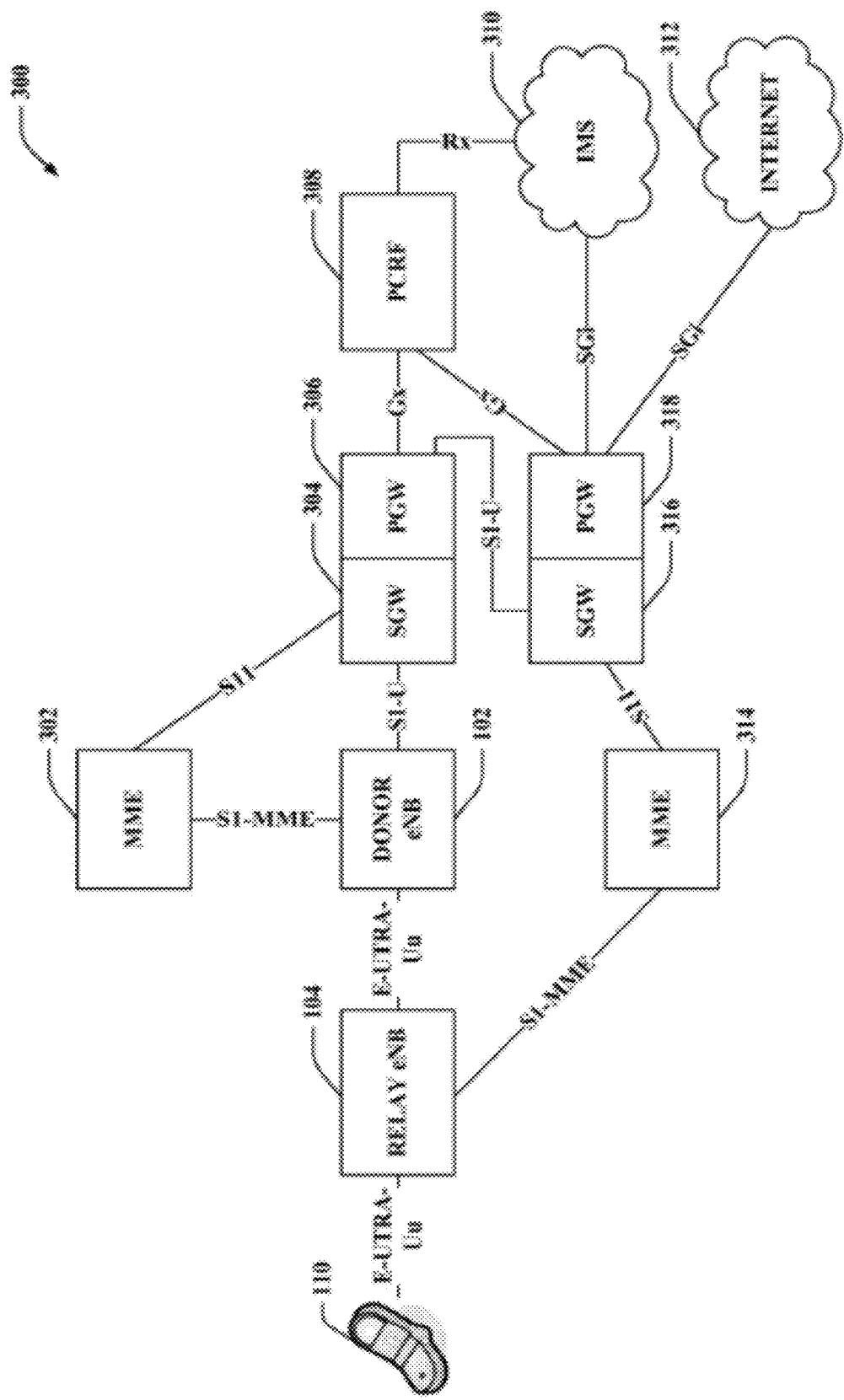
FIG. 3 is a block diagram conceptually illustrating an example of a telecommunications system utilizing a relay, in accordance with 3GPP LTE and EPC standards, as one example.

Turning to FIG. 3, an example wireless communication network 300 that provides UE relay functionality is depicted. Network 300 includes a UE 110 that communicates with a relay eNB 104, as described, to receive access to a wireless network. Relay eNB 104 can communicate with a donor eNB 102 to provide access to a wireless network, and as described, donor eNB 102 can communicate with a SGW 304, which can be related to the relay eNB 104. SGW 304 can connect to or be coupled with a PGW 306, which provides network access to SGW 304 and/or additional SGWs. PGW 306 can communicate with a PCRF 308 to authenticate/authorize relay eNB 104 to use the network, which can utilize an IP multi subsystem (IMS) 310 to provide addressing to the relay eNB 104. In addition, SGW 304 can connect to MME 302 to facilitate communication from the relay eNB 104 via donor eNB 102.

According to an example, MME 302, SGW 304, and/or PGW 306 can be related to donor eNB 102 serving substantially all relay eNBs in the cluster. UE 110 can also have an associated SGW 316 and PGW 318, where the PGW 318 provides addressing to the UE 110. PGW 306 can communicate with SGW 316 and PGW 318 to provide such access. Additionally or alternatively, PGW 318 can communicate with PCRF 308 and/or the Internet 312 to provide network access. Moreover, for example, SGW 316 can communicate with MME 314, which can be related to UE 110, to facilitate control plane communications from the UE 110. It is to be appreciated that MME 302 and MME 314 can be the same MME, in one example. Similarly, SGW 304 and SGW 316 can be the same SGW, and PGW 306 and PGW 318 can be the same PGW, for example.

In an example, UE 110 can communicate with the relay eNB 104 over an E-UTRA-Uu interface, as described, and the relay eNB 104 can communicate with the donor eNB 102 using an E-UTRA-Uu interface, since the relay eNB 104 functions like a UE at the donor eNB 102. Donor eNB 102 communicates with the MME 302 using an S1-MME interface (e.g., via SGW 304) and the SGW 304 and PGW 306 over an S1-U interface, as depicted. In addition, as shown, MME 302 can communicate with SGW 304, and MME 314 to SGW 316, using an S11 interface. PGWs 306 and 318 can communicate with PCRF 308 over a Gx interface. Furthermore, PCRF 308 can communicate with IMS 310 using an Rx interface, and PGW 318 can communicate with IMS 310 and/or the internet 312 using a SGi interface.

Of course, those skilled in the art will realize upon a review of the instant disclosure as a whole that the disclosed concepts may be equally applied to a different system, e.g., one utilizing W-CDMA or other technologies. For example, in a UTRA network utilizing a W-CDMA air interface, the donor base station (i.e., donor NodeB) may be coupled to a core network component such as a radio network controller (RNC). In other technologies, such as cdma2000, WiMAX, etc., a donor base station may be coupled to any suitable core network component.

In a wireless communication system, low-cost relays may be desired for extended coverage to holes or poor coverage areas, increased capacity by cell splitting gain, and for offloading resource requirements from individual base stations. While relays generally utilize a wireless backhaul, relays may share the wireless resources of the base station with disparate UEs. In this case, since the relay generally acts like a UE (or several UEs) on the backhaul link, and is served by the donor base station, it may share this donor base station with true UEs. Further, if the relay serves multiple UEs, the backhaul carries the user traffic for these UEs. Moreover, while relays may be placed to cover areas that might otherwise have poor coverage, this may result in a weak backhaul link even with a directional antenna at the relay.

Each of these issues may present potential capacity limitations at the donor base station, and an increase in latency for the backhaul and any UE served by the relay, due to a potential bottleneck at the backhaul link. That is, even if the access link from the relay to the UE is very good, the backhaul link may be a bottleneck, and a UE may be better off being served directly by a NodeB instead of the relay. Thus, various aspects of the present disclosure consider the wireless backhaul link when deciding whether a UE should be served by a relay or a base station directly.

Whether communicating with a base station or a relay, UEs typically measure and report the quality of the access link for purposes such as deciding whether to perform a handoff and serving cell change. But while a base station's access link may be an adequate measure for this purpose, a relay's access link may not be, since the quality of the relay backhaul link may impact the relay access link, and this impact is not generally taken into consideration when determining a handoff. Moreover, UEs are generally not able directly to measure the backhaul quality. Only the relay and the donor eNB hosting it can directly measure the quality of the backhaul link.

Thus, in an aspect of the disclosure, existing signaling may be utilized to report information about the backhaul link to the UE.

That is, when a UE is served by a relay, information relevant for handoff (such as instructions from a network node informing the UE what thresholds or conditions would trigger a report back to the network, and UE reports back to the network related to the RAL) generally passes through the relay. Further, the relay generally has access to its own measurements of the wireless BHL. Thus, a relay may have access to all the information relevant for determining whether to handoff the UE to a base station.

However, this may not be the case when a UE is currently served by a base station, and would benefit from handoff to a relay. Here, UE reports and instructions for the UE may be routed through the base station and not via the relay. Yet, the relay's measurements of the BHL may be reported to the network by way of that base station or a different base station. Thus, in a further aspect of the disclosure, a more central network node (such as an RNC or other suitable network node in an HSPA network, or any suitable network node in an EPC or other network) may provide the information relevant for determining handoff.

Because UEs generally report access link measurements to the network, one or more network nodes may have access to this information. Relays may also report measurements of the wireless BHL to the network. These reports are typically generated upon events, such as detecting a pilot channel exceeding a given signal to interference ratio, or one base station's pilot exceeding another base station's pilot by a given amount. However, determining handoff decisions based on separate reports about the access link and the backhaul link can be problematic. That is, the access link reports are generally triggered based on access link quality without considering backhaul, and the backhaul reports would be triggered based on backhaul link quality only.

In general, there may be no way to accurately determine if one or the other measurement reports remains valid once the other is reported. That is, there is a potential not only for delay but also erroneous handoff decisions. Even if periodic reporting is used, the overhead may significantly degrade capacity.

Thus, in accordance with various aspects of the disclosure, event reports may be determined at the UE for handoff either to or from a relay, wherein the UE event reports take into account the relay's BHL.

Figure 4:
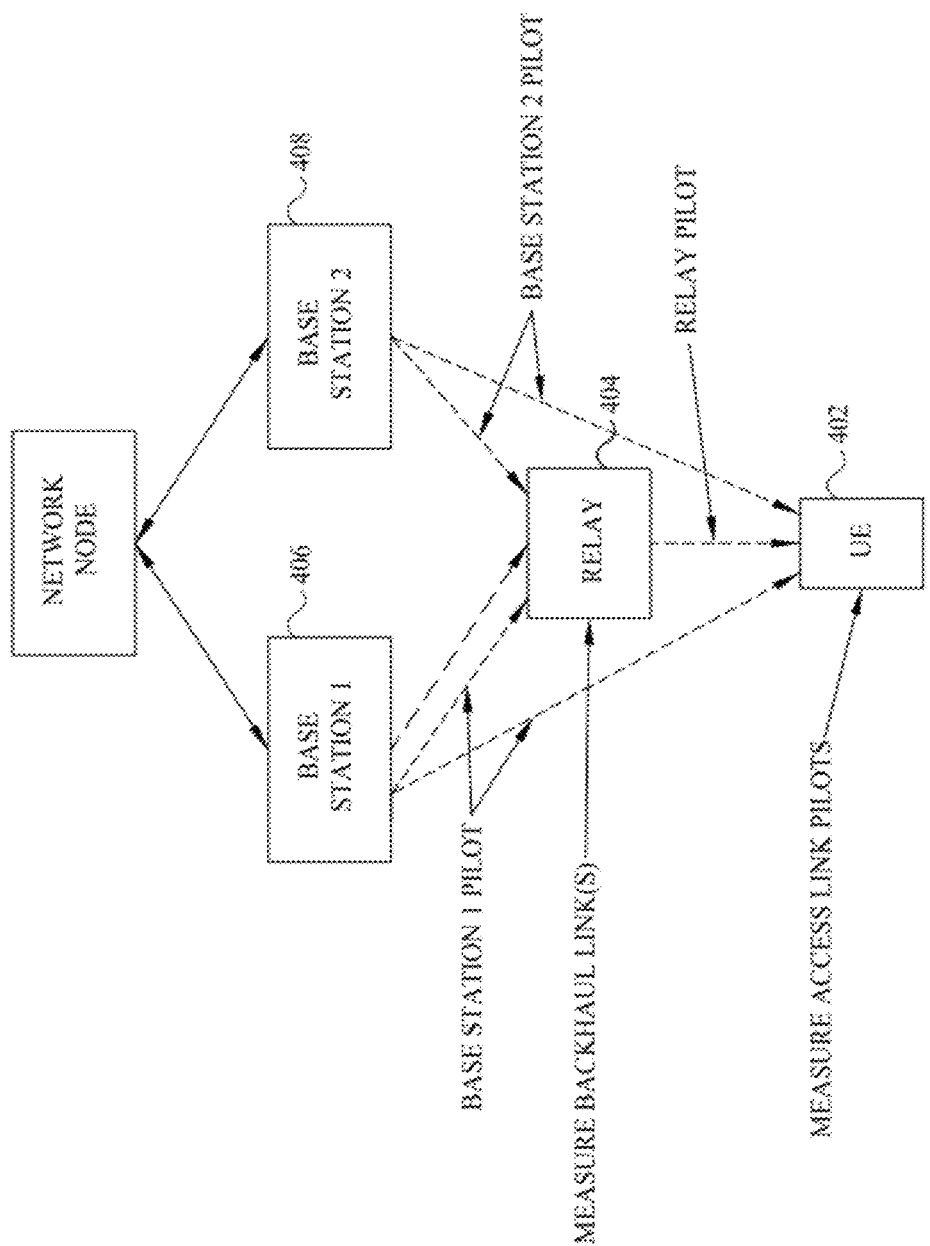
FIG. 4 is a block diagram illustrating signals between certain nodes in a wireless communications system utilizing a relay.

When a UE is directly served by a base station, performance generally depends on the geometry, or signal to noise and interference ratio, for that direct access link. In contrast, when a UE is served by a relay, performance generally depends on both the geometry for the relay access link RAL $G_{UE}^{RAL}$ and the geometry for the backhaul link(s) BHL from the relay(s) to the intermediary node(s) $G_R^{BHL}$ (e.g., the donor base station). In general, the weakest of the links is the bottleneck. In particular, for a two-hop connection (i.e., a single relay between a UE and a donor base station, as illustrated in FIG. 4), the geometry bounding performance G is the minimum of the two:

$$G = \min(G_R^{BHL}, G_{UE}^{RAL})$$

where the geometry is defined as the ratio of the total reference cell transmit power spectral density $I_{or}$ over the total power spectral density of interference from all cells $I_{oc}$, including thermal noise at the node n (the UE or the relay) for the link l (antenna). That is:

$$G_n^l \equiv \frac{I_{or}}{I_{oc}}.$$

Thus, in some aspects of the disclosure, the relay may provide information related to the backhaul link (e.g., the backhaul link geometry $G_R^{BHL}$) to the UE. The relay may provide this information directly to the UE over the relay access link RAL, or indirectly to the UE by sending the information by way of intermediary nodes such as the donor base station and/or a network node. The UE may then utilize this information to compute the bounding value G, and in turn use the bounding value G in determining whether to provide an event report.

Direct signaling to the UE over the RAL can be simplified if the relay is capable of communicating over upper layers, similar to an RNC. However, even in the lower layer-only case, the relay may signal a low-layer indication (e.g., control channel or puncturing) or indirectly (e.g. via an RNC, a base station, or another suitable network node).

If there are multiple relays in the link in question, i.e., more than two hops, then each relay may perform the bounding computation, and may pass the bounding value along so that the minimum geometry propagates to the UE, and thus the end bound is the minimum of all the links. For example, for a three hop (m=3) connection via relays 1 and 2, we have, $$G_m = \min(G_{m-1}, G_{UE}^{RAL}) = \min(\min(G_{R(m-2)}^{BHL}, G_{R(m-1)}^{BHL}), G_{UE}^{RAL}).$$

However, this may require new signaling to send the backhaul geometry (or pilot channel Ec/Io, or receive signal strength, or path loss) from the relay to the UE, and this may not be transparent to UEs. Thus, in another aspect of the disclosure, the relay may adjust its pilot power (overhead ratio) so that UE measurements of the pilot power of the relay access link RAL are biased either up or down depending on the backhaul link BHL. For example, the relay could lower its pilot power in proportion to the expected backhaul bottleneck. However, this may impact the relay's coverage, and may require a new operation by the UE (e.g., to compute the minimum).

Another aspect of the disclosure that may be more transparent to UEs and non-relay nodes includes sending a compensation parameter from the relay to the network infrastructure which forwards the parameter to the UE, where the UE compensates handoff determinations.

As depicted in FIG. 4, a UE 402 may directly measure the access links to one or more relays 404, as well as access link to one or more base stations 406, 408. In addition, the relay 404 may measure the backhaul link(s) to the base station(s) 406 that serves the relay 404 as well as a pilot from one or more disparate base stations 408. Here, the relay 404 may determine how the UE 402 should compensate the UE's measurement of the access link to the relay 404, in order to obtain a result equivalent to considering the relay's backhaul link directly. The compensation may be communicated to the infrastructure where it is communicated to the UE via signaling, potentially after combining the compensation with other factors such as base station pilot transmit power offsets.

In some aspects of the disclosure, the relay 404 may determine the compensation for the backhaul link as a bias β for the UE 402 to apply when measuring its access link. That is, a UE may be biased against a relay if the relay has a limited backhaul link, or if the relay has a high load; or the UE may be biased toward a relay if the backhaul link is good or if the relay has a small load.

In a carrier-dimensioned single-carrier relay design, where the downlink and uplink of the backhaul link are on one carrier (frequency pair), and the downlink and uplink of the access link are on another carrier (frequency pair), but both are single-carrier, the relay 404 may determine the compensation by examining the pilot strength from the donor base station 406 relative to a target reference value (e.g. based on the pilot power overhead on the donor base station 406). If the pilot portion of power in dB is represented by $P_{ref}^{BHL}$, and the relay's measurement (e.g., the signal energy to noise and interference ratio or Ec/Io) of the BHL is represented by $M_R^{BHL}$, then the bias β may be determined as:

$$\beta = M_R^{BHL} - P_{ref}^{BHL}.$$

For example, if 10% of the cell power of the donor base station is allocated for pilot, $P_{ref}^{BHL} = -10$ dB, and if the relay measures the pilot on the backhaul as $M_R^{BHL} = -13$ dB, then β=−3 dB.

In a scenario where the relay pilot on the access link is boosted by $P_{ref}^{RAL} = -7$ dB relative to the donor base station for earlier detection, then a boosted bias β' may be determined as:

$$\beta' = M_R^{BHL} - P_{ref}^{BHL} - (P_{ref}^{RAL} - P_{ref}^{BHL}),$$

or $$\beta' = M_R^{BHL} - P_{ref}^{RAL}.$$

Thus, the boosted bias β' may be independent of the intermediary node's pilot power, and the relay may not have to know that reference value. For the example above, β'=−13 dB−(−7 dB)=−6 dB.

Figure 5:
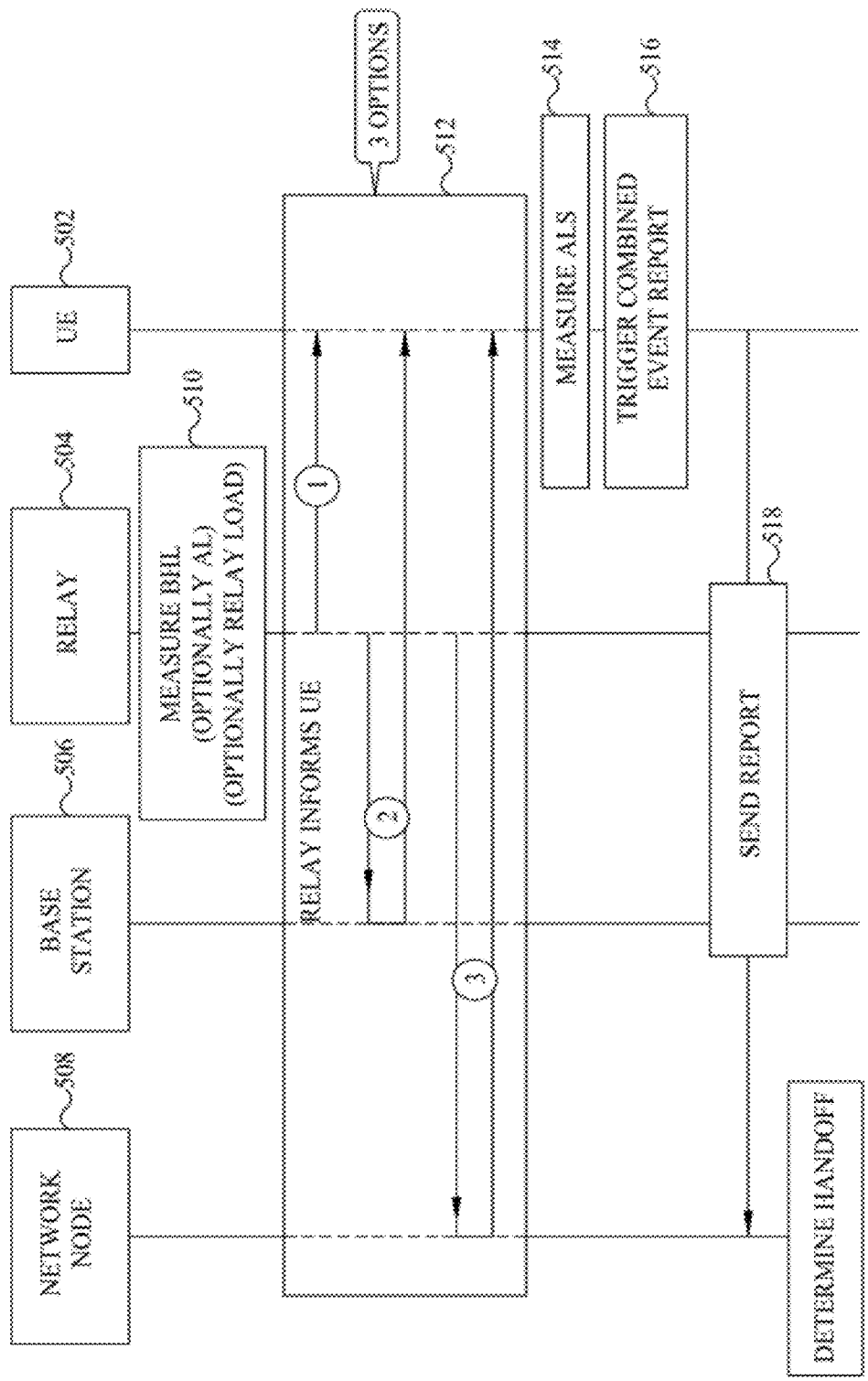
FIG. 5 is a call flow diagram illustrating a process of utilizing backhaul link information to determine a trigger event in accordance with some aspects of the disclosure.

FIG. 5 is a call flow diagram illustrating a relay 504 determining a bias β for UE measurement and reporting. In block 510, the relay 504 determines a characteristic of the BHL between the relay 504 and the donor base station 506. For example, the relay 504 may directly measure a pilot power of the BHL. Further, the relay 504 may observe a loading of the donor base station 506, e.g., by determining how many UEs are being served by the donor base station 506. The relay 504 may further determine one or more characteristics of the RAL between the relay 504 and the UE 502. For example, the relay 504 may access channel quality information obtained by the UE 502, provided by the UE 502 on an uplink channel and accessible by the relay 504. The relay 504 may further determine a characteristic of the loading of the relay 504, e.g., relating to the number of UEs being served currently or in the recent history by the relay 504 and/or the amount of traffic passing through the relay 504. Here, the relay 504 may utilize this and/or other suitable information to determine the bias $\beta$.

In various aspects of the disclosure, as illustrated in block 512, upon determining the bias $\beta$, the relay may provide the bias $\beta$ to the UE 502 directly (1), by way of the donor base station 506 (2), or by way of a network node 508 (3). The bias $\beta$ may be provided to the UE 502 directly as a new information element, or may be provided in the form of an existing variable in already-specified channels, such as taking the place of the CIO.

Option (1), where the relay 504 provides the bias $\beta$ to the UE 502 directly, may be utilized when the relay 504 is the primary serving cell for the UE 502, and the UE 502 is considering handing off to the donor base station 506 or some other disparate base station. Here, it may not be necessary for the donor base station 506 or the network node 508 to be aware of this signaling. Option (2), where the relay 504 provides the bias $\beta$ to the donor base station 506, which thereby provides it to the UE 502, may be utilized when the donor base station 506 is the primary serving cell for the UE 502, and the UE 502 is considering handing off to the relay 504. Option (3), where the relay 504 provides the bias $\beta$ to the network node 508, which thereby provides it to the UE 502, may be utilized when some other, disparate base station other than the donor base station 506 is the primary serving cell for the UE 502, and the UE 502 is considering handing off to the relay 504. Alternatively, option (3) may be utilized when the UE 502 is served by the donor base station 506, and the UE 502 is considering handing off to the relay 504.

When the relay 504 provides the bias $\beta$ to the UE by way of the network node 508 (3), the bias $\beta$ may be included in measurement controls or instructions that are sent as a Layer 3 message to the UE 502 in a fashion generally transparent to the donor base station 506. Here, the UE 502 may receive those measurement controls or instructions, a list of base stations (including the relay 504), and the bias (or biases) $\beta$ for the relay 504.

In block 514, the UE may measure one or more characteristics of the RAL between the relay 504 and the UE 502. Here, as illustrated in block 516, when measuring the characteristic(s) of the RAL, the UE 502 may apply the bias $\beta$ to measurements it makes of the relay 504, although the UE 502 may not know that the access link it is measuring is from a relay. When the relay 504 provides the bias $\beta$ to the UE by way of the network node 508 (3), it does not matter whether the UE 502 is currently being served by the relay 504 or not, since the message from the network node 508 may reach the UE 502 by way of one or more disparate base stations other than the donor base station 506.

Further, in block 516, the measurement controls or instructions may configure a trigger so that the UE 502 reports a condition where the relay's biased measurement report satisfies a condition (e.g., the biased measurement of the RAL exceeds a base station's access link quality by an amount for a given time, or exceeds a threshold, or other suitable comparisons). When the UE detects the condition, it may trigger and send a report 518 of the event to the network node 508, which may then determine a handoff or serving cell change based on the reported information. This report is timely because it takes into account the quality of the backhaul link BHL without the UE 502 having to know that it is taking this into account. That is, the UE 502 may merely apply the bias $\beta$ to a relay access link RAL that, to it, appears to be just another access link to a base station.

Figure 6:
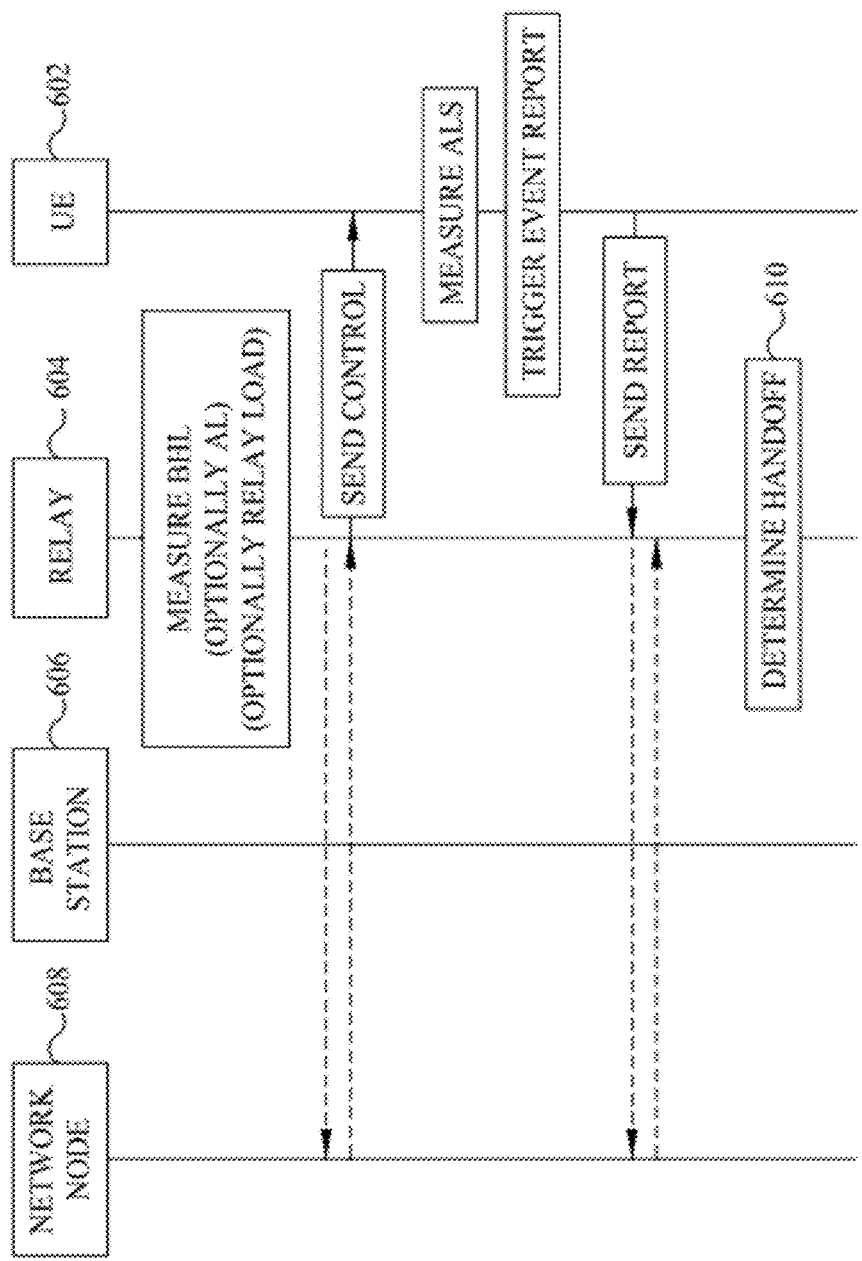
FIG. 6 is a call flow diagram illustrating a process of utilizing backhaul link information to determine a trigger event in accordance with some aspects of the disclosure.

FIG. 6 is a call flow diagram illustrating a similar scenario as discussed above with respect to FIG. 5, however, here, the relay 604 performs additional functions. That is, in block 610, rather than the network node, the relay 604 utilizes the information that it determined with respect to the BHL, and the information determined with respect to the RAL (either measured by the relay 604 or the UE 602), to determine whether the UE 602 will undergo a handoff between the relay 604 and a base station such as the donor base station 606.

In accordance with various aspects of the disclosure, an information element already provided in some wireless communication standards may be utilized with an altered purpose, e.g., to represent the bias $\beta$. For example, in a UTRA network utilizing a W-CDMA air interface, a cell individual offset (CIO) is a parameter utilized in the calculation of certain handoff events by a UE. The CIO is specific to a cell, and as specified, can be positive or negative. Of course, those skilled in the art will comprehend that other, similar parameters may be appropriated in other standards to be utilized to carry the bias $\beta$ in a similar fashion.

In some aspects of the disclosure, the compensation factor or bias $\beta$ sent from the relay to the UE may be bounded within a range [$\beta$min, $\beta$max] that may limit the impact of the consideration of the BHL. For example, a CIO for a particular relay R may be represented as:

$$CIO^R = \max(\min(\beta, \beta^{max}), \beta^{min}).$$

Although the upper and lower bounds may be of the same magnitude or equal, generally this is not necessary. That is, generally, the bias $\beta$ will not be used for the relay unless the relay pilot power portion is lower than the intermediary node (base station) pilot power portion. The lower bound limits the bias against the relay due to backhaul impact. However, the upper bound limits the bias toward the relay due to pilot power offset. Thus these bounds may differ.

Biasing a low pilot SINR (Echo) measurement upward may be more problematic than biasing a high pilot SINR (Echo) measurement lower because lower measurements are typically more uncertain. Thus, in some aspects of the disclosure, the upward bias may be more constrained or even limited to 0 (no upward bias). For example, the allowed range may be [−3 dB, 0 dB]. One way to compute the upper bound is:

$$\beta^{max} = M_{H/O}^{DAL} - M_{min}^{RAL},$$

where $M_{min}^{RAL}$ is the minimum reliable RAL SINR (e.g., Ec/Io=−16 dB), and $M_{H/O}^{DAL}$ is the expected direct access link SINR at the desired UE handoff boundary (e.g., −16 dB).

Once the relay communicates the bias $\beta$ to the UE (either directly or through the network), the UE may determine handoff event reports. In an aspect of the disclosure, that bias $\beta$ may be a CIO for the relay that determined the bias $\beta$. That is, the UE may measure the RAL pilot, as $M_{UE}^{RAL}$, and may apply the provided bias $CIO^R$ (e.g., $\beta$ or $\beta'$) to obtain a biased measurement, $$\hat{M}_{UE}^{RAL} = M_{UE}^{RAL} + CIO^R.$$

Here, if the UE measures the relay access link pilot as $M_{UE}^{RAL} = -7$ dB, then the biased measurement is $\hat{M}_{UE}^{RAL} = -13$ dB.

The UE may also measure a direct access link with a disparate base station other than the donor base station, or another relay's access link, and compare to the biased measurement of the relay to determine if a handoff event occurred. For example, suppose the UE measures a disparate base station's direct access link as $M_{UE}^{DAL}=-15$ dB. According to one example, the UE may then compare as follows to determine if a handoff event occurs:

$$M_{UE}^{DAL} + CIO^M + H \overset{?}{\lessgtr} M_{UE}^{RAL} + CIO^R,$$

where H is a hysteresis value to prevent UE ping-ponging handoff from one cell to another, and $CIO^M$ is a CIO for the intermediary macro cell (e.g., $CIO^M=0$). Note that it is equivalent to apply the opposite bias to other cells as to apply the bias to the relay. For example, $CIO^M=-\beta$, and $CIO^R=0$.

Suppose the UE is currently served by the disparate base station, and suppose H=0 dB. The UE's comparison yields a left-hand side of 2 dB less than the right hand side, indicating that the relay is now the best cell, and the UE may then trigger an event report to inform the network that a handoff may be desirable. The network may then command the UE to switch its serving cell to the relay. The UE is then served across two wireless links instead of one: the RAL and the BHL. Here, while the RAL is strong, the bottleneck is likely the BHL. So effectively, the tradeoff from a handoff perspective (having full knowledge) is between the backhaul ($M_R^{BHL}=-13$ dB) and the disparate base station direct access link ($M_{UE}^{DAL}=-15$ dB). Thus, the correct action is taken even though the UE does not have such full knowledge.

The UE can perform the same comparison when served by the relay (typically the hysteresis is applied to the current serving cell and would thus be on the right hand side). Then, when the right hand side drops below the left hand side, the handoff event would be triggered indicating a motivation to handoff from the relay to the node whose measurement caused the condition.

In another aspect of the disclosure, the UE may compare the biased relay measurement to an add or drop threshold (such as when adding or dropping a cell from the Active Set or set of cells with which the UE is in soft-handoff with). Alternatives such as comparing to a weighted sum of cell measurements may also be used in some aspects of the disclosure.

Figure 7:
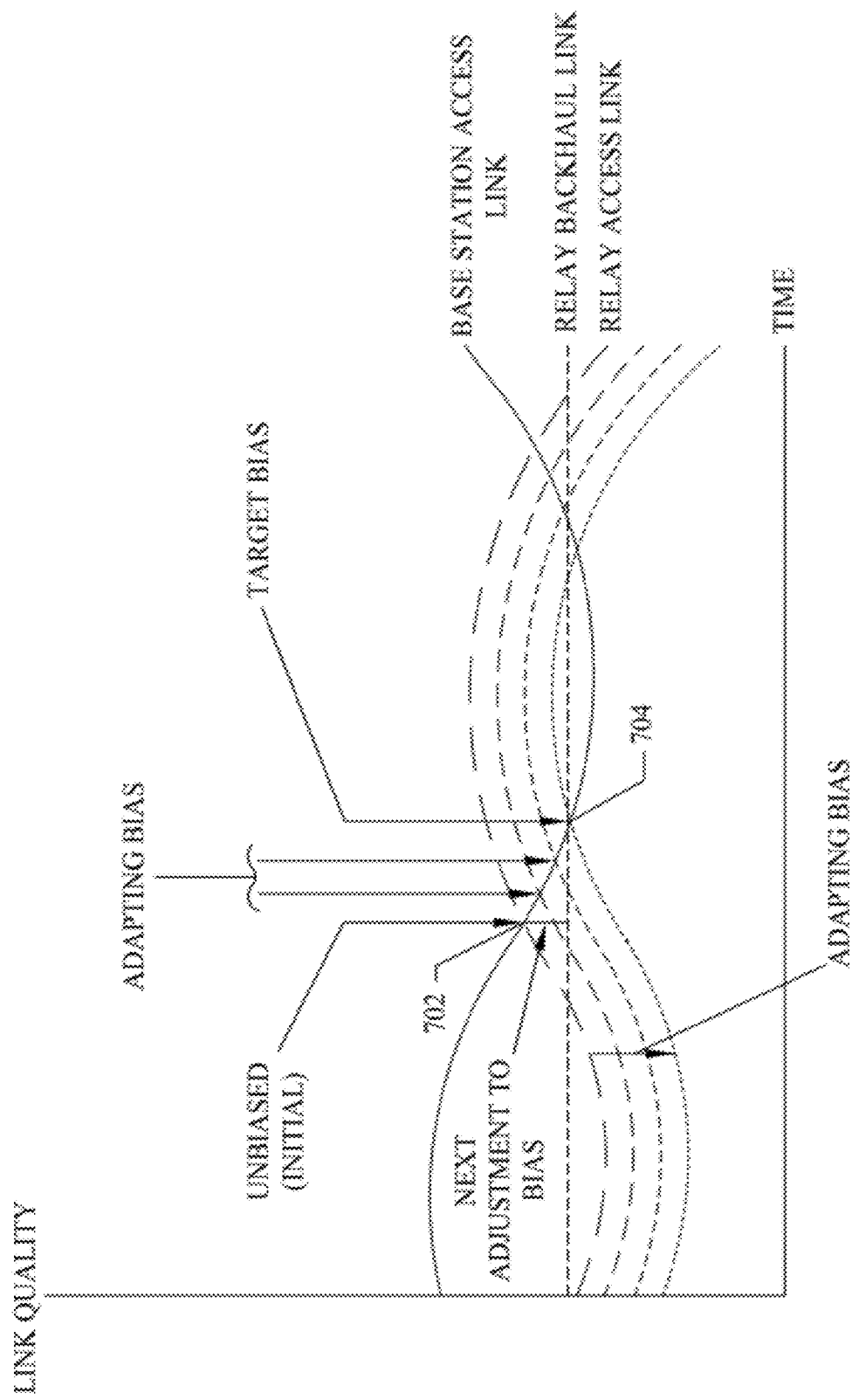
FIG. 7 is a chart illustrating adaptation of a bias in accordance with some aspects of the disclosure.

FIG. 7 is a graph illustrating the adaptation of a bias in accordance with an aspect of the disclosure. By observing the UE's reported access link measurements, the relay or other network element can determine how much of an offset (bias β) should be applied at a minimum for it to be worthwhile for the UE to handoff or remain on the relay. That is, in order for the UE to prefer Cell A:

Measure of Cell A+Cell A's Bias(CIO)>Measure of Cell B+Cell B's Bias (CIO)

Specifically, the CIO can be computed as follows. When a UE triggers a report that the best serving cell changed, i.e., another cell is better than the current serving cell, the triggering measurements are communicated. For example, as illustrated in FIG. 7, at point 702, the measurement of the RAL exceeds that of the direct base station access link DAL. At this time, the BHL measurement may also be done (e.g. by the relay). If one of these measured cells is actually a relay, the difference between either of these cells' measurements and the BHL measurement reflects the minimum bias. Once this bias is signaled to the UEs, and the UEs generate new reports using those biases (illustrated by the descending series of dashed lines), the bias can be incremented until the difference becomes 0, as illustrated at point 704, and the measurements at the time of UE report correspond to the BHL measurement.

In a further aspect of the disclosure, the report from the relay that includes information relating to the BHL may take into account the load of the BHL. The load of the BHL is not the same as the load on the base station, but rather, it depends on the traffic for UEs already being served by the relay. To do this, the BHL quality can be converted to, or depend in part upon, a throughput (or rate) equivalent. The impact of the load can then be subtracted from the throughput equivalent to get a potential rate for another UE. This can then be converted back to a quality equivalent, and a bias (offset) can be computed based on the difference between this and the base station access link quality at the edge of the relay/base station coverage area, i.e., the handoff point. Thus, when the UE adds the bias (CIO) to the base station access link measurement, or subtracts the bias (CIO) from the relay access link measurement, the base station and relay node quality comparison becomes equal at the desired handover point. A simplified method to do the conversion may be to approximate Eb/Nt using Ec/Io, and convert Eb/Nt to the achievable bit rate given the desired error rate, similarly to the method a conventional UE uses to compute Channel Quality Indicator (CQI).

Also, since the bias may be known or controlled by the relay or the network node, the current value of the bias may be taken into account when determining whether to adjust the bias to a new value when load or backhaul link quality changes. Thus, in some aspects of the disclosure, the method can be applied in an adaptive mode where the bias is adapted to achieve the desired (or optimal) handoff points. For example, the bias can be increased and decreased (in increments or steps) depending on whether the handoff point is achieved; or as the backhaul link quality changes; or the load on the host base station or nearby cells changes; or as the load on the backhaul changes.

In a non-FDD (carrier-dimensioned) relay system, that is, where relays and non-relay nodes share a frequency or carrier, the bias β may take into account that the interference between these nodes may lower the SINR (Ec/Io) reference values at the boundaries (handoff points). That is, the bottleneck may less frequently be the backhaul. Thus, negative biases may be softened (reduced) to account for this.

Another factor to consider is backhaul link bandwidth. A relay's backhaul link bandwidth available for a new user may be constrained due to other users it is serving. For example, a relay serving N UEs may only have a fraction 1/N of the backhaul bandwidth available for each UE, and thus, may apply an additional bias such as the fraction (in dB). However, in some aspects of the disclosure, the backhaul link bandwidth is not considered, since a relay may act as one UE per UE it serves, and thus, the total bandwidth over the backhaul may scale with the number of UEs. However, if the relay has a smaller total fraction of bandwidth due to factors such as duplexing (e.g. time division duplex) or fewer carriers, then this fraction should be accounted for in the bias because it may not be scalable due to scheduling.

The geometry differences at cell boundaries between a relay's coverage and other nodes may vary depending on which other cell's coverage borders the relay's coverage at the particular location. For example, the relay geometry may be relatively good on the cell boundary that borders with a first macro cell A, but relatively poor at a cell boundary that borders with a second macro cell B. In this case, the geometry of the backhaul link may be the bottleneck only with respect to comparison with the first cell A, motivating the use of no bias for users on the border with the second cell B that are considering handoff to or from the relay. Thus, a relay may determine a bias depending on the current serving cell of a UE. The relay may send all of these biases to the network. Since the network knows the current serving cell of each UE, it may send the appropriate bias to the UE.

Alternatively, the biases can be applied by the UE not to the RAL, but to access links with non-relay nodes. Thus, multiple biases may be sent to the UE, but the UE may use a particular bias depending on which node the relay is being compared to.

In a further aspect of the disclosure, the relay may provide a request to the UE, or the UE may provide a request to the relay, to measure aspects of the link from the donor base station. For example, the relay may request the UE to measure the direct access link DAL between the donor base station and the UE, and provide this information to the relay. Or, the UE may request the relay to measure the BHL, and provide this information to the UE. In this way, the UE and/or the relay can compare two measurements of the channels transmitted from the donor base station, in effect, obtaining a second opinion on its own measurement. That is, both measurements are measurements of transmissions from the same transmitter, i.e., the donor base station. Thus, the relay may utilize a strategy to control the UE to make measurements on its behalf, so that it can make an aggregated or combined decision on how to bias the UE.

When the BHL and the RAL share the same carrier/frequency, it will be realized that a UE may be capable of simultaneously monitoring both the RAL and a direct access link DAL with the base station serving the relay. Here, the relay may be capable of ascertaining comparable loads for the UE in computing the bias. For example, the received DAL overhead power as measured by the UE may be compared with the BHL overhead power as measured by the relay. Further, the DAL slot utilization, as determined by the UE, may be compared with the BHL slot utilization. These comparisons may be utilized for additional accuracy in the computation of the bias $\beta$.

Further, such a second opinion may be obtained even if it is another, disparate base station other than the donor base station. That is, the UE could measure an aspect of a transmission from the disparate base station, and the relay could measure an aspect of the transmission from the same disparate base station. Here, the relay may have a directional antenna directed toward its donor base station, thus a measurement of transmissions from a different, disparate base station may be attenuated. Nonetheless, the relay may still be able to receive a link from the disparate base station to provide additional information to inform a handoff decision.

In some aspects of the disclosure, the determination of whether the UE should undergo the handoff may be performed at different network entities depending on the direction of the handoff. For example, the relay may determine whether a handoff away from the relay should be performed, while a suitable network node such as the RNC may determine whether a handoff from a base station to the relay should be performed, or vice-versa. These decisions may be adapted to be less aggressive if a UE bounces back and forth between nodes (e.g., ping-pong effect), and more aggressive otherwise. However, the adaptation may be made in balanced steps so that the converged handover point does not migrate.

In some aspects of the disclosure, when the UE is being served by the relay, the relay may adjust the UE's measurement reports before forwarding them on to the network, or even block the UE's measurement reports and generate reports on behalf of the UE without a report from the UE. In other words, the relay may selectively modify UE reports in consideration of its own BHL measurements. Further, the relay may selectively forward a potentially modified report to the network node via the BHL. In this way, since the network node is generally under the impression that the report it receives came from the UE, the network node may not require modification.

In a further aspect of the disclosure, the concepts described above may be applied to different systems, e.g., those utilizing a femtocell access point. That is, in some aspects of the disclosure, the use of the term "relay" may refer to a femtocell access point. Here, a femtocell is a node that acts as a base station, and typically utilizes a DSL or cable modem connection as a backhaul to connect a UE to the core network utilizing the Internet. The backhaul connection to the core network in this example may then be wired, wireless, or a combination of the two. Here, in much the same way as that discussed above with a relay, the backhaul link (e.g., the DSL or cable modem) may be a bottleneck in the communication between the UE and the core network. Thus, the femtocell may act in much the same way as the relay described above, and the UE may bias its measurements of an access link to the femtocell in accordance with characteristics of the backhaul link.

Figure 8:
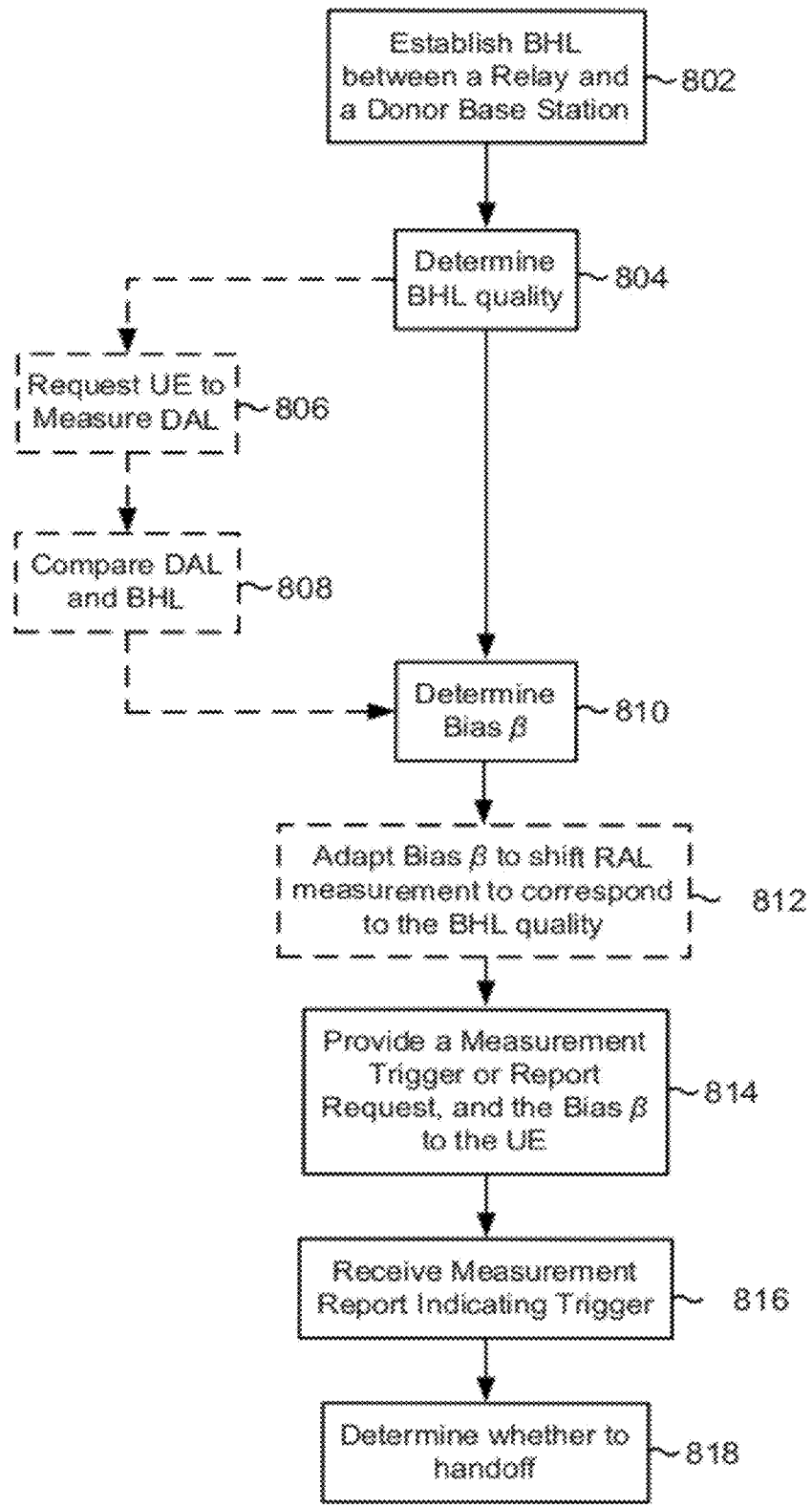
FIG. 8 is a flow chart illustrating a relay's process of utilizing backhaul link information to determine whether to handoff a UE to or from a relay in accordance with some aspects of the disclosure.
Figure 9:
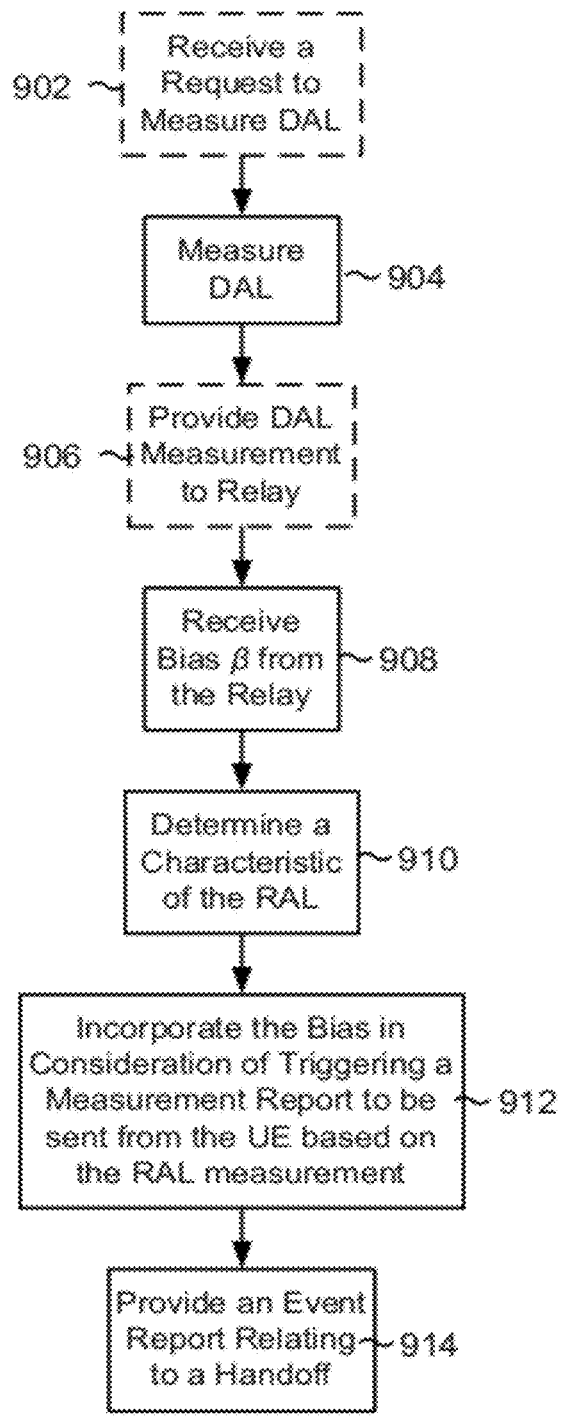
FIG. 9 is a flow chart illustrating a UE's process of utilizing backhaul link information to determine an event report relating to a handoff to or from a relay in accordance with some aspects of the disclosure.

FIGS. 8 and 9 are flow charts illustrating exemplary processes of determining and utilizing a bias in accordance with some aspects of the disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

In FIG. 8, an exemplary process generally performed by a relay is illustrated. In some aspects of the disclosure, the process may be implemented by the relay/base station 1010 illustrated in FIG. 10 (described below), and/or the processing system 1114 illustrated in FIG. 11 (described below). In other aspects, the process may be implemented by any suitable node in a wireless communication system. In block 802, the process establishes a backhaul link BHL between the relay and a donor base station. The BHL may be a wired or wireless backhaul link, and the relay may be any suitable relay as described above. In block 804, the process determines a characteristic of the BHL between the relay and the donor base station. Here, the characteristic may refer to a quality of the link. The quality may include a geometry of the backhaul link $G_R^{BHL}$, BHL loading information, a bandwidth of the BHL, a signal energy to noise and interference ratio of a pilot channel of the BHL, or any other suitable characteristic useful in determining a bias.

In optional block 806, the relay may request for the UE to measure a characteristic of the DAL between the donor base station and the UE, or a DAL between a disparate base station other than the donor base station and the UE. In this way, the computation of the bias may correspond to a comparison of the characteristic of the DAL determined by the UE, and the characteristic of the BHL, determined by the relay. That is, in optional block 808, the relay may make the comparison of the characteristic of the BHL and that of the DAL to compute the bias $\beta$.

In block 810, the bias $\beta$ is determined. In some aspects, as discussed above, the bias $\beta$ may be used to represent an offset to be applied to a measurement of the RAL between the UE and at least one of the relay, the donor base station, or a second base station other than the donor base station. Further, the bias $\beta$ may be adapted to be utilized by the UE when the UE considers whether to provide an event report based on a measurement of a relay access link RAL between the relay and the UE.

In optional block 812, the process may adapt the bias β such that a UE report of the RAL in accordance with the bias is shifted to correspond to the quality of the BHL. In another aspect of the disclosure, the bias β may be adapted such that a handoff event is triggered when the quality of the BHL corresponds to a quality of the RAL, as determined by a previous measurement of the RAL.

In block 814, the process provides a measurement trigger or report request, along with the bias β, to the UE. Here, the bias β may be provided to the UE in the form of a cell individual offset CIO. The providing of the bias β to the UE may be accomplished by directly transmitting the information from the relay to the UE over the RAL between the relay and the UE; by transmitting the information from the relay to the donor base station over the BHL, to be provided to the UE over the DAL between the donor base station and the UE; or by sending the information from the relay to a network node (e.g., an RNC) to be provided to the UE over a link between the network node and the UE. The link between the network node and the UE may include a downlink between either the donor base station or a disparate base station other than the donor base station and the UE.

In block 816, if the UE determines that an event has occurred that merits the sending of a measurement report message, the relay receives the measurement report message indicating that the trigger event has occurred. Here, the determination of whether the trigger event occurred is based on a biased measurement made by the UE, in accordance with the bias determined by the relay. In block 818, the process determines whether to perform the handoff, based at least in part on the measurement report received. Here, the determination of whether to perform the handoff may not necessarily be performed by the relay, but in some aspects of the disclosure, a network node or even the UE itself may make the determination.

FIG. 9 is a flow chart illustrating another aspect of the disclosure, illustrating a process that may be performed by a UE. For example, in some aspects, the process may be implemented by the UE 1050 illustrated in FIG. 10 (described below), and/or the process may be implemented by the processing system 1114 illustrated in FIG. 11 (described below). In other aspects, the process may be implemented by any suitable node in a wireless communication system.

In optional block 902, the UE may receive a request from a relay to measure a characteristic of a direct access link DAL between the donor base station serving the relay and the UE. In this way, if the characteristic of the DAL is provided to the relay, the relay can utilize multiple measurements of the access link from the donor base station (i.e., in addition to the backhaul link BHL between the donor base station and the relay) to determine the bias β. In block 904, the UE measures the characteristic of the DAL. In optional block 906, the UE may provide the measured characteristic of the DAL back to the relay, as discussed above, for utilization in determining the bias β.

In block 908, the bias β is received from the relay. The bias β may be received directly from the relay, or by way of an intermediary, such as the donor base station serving the relay, or another, disparate base station other than the donor base station. Further, the bias β may be received in the form of a cell individual offset (CIO), or in any suitable message format.

In block 910, a characteristic of the relay access link RAL between the relay and the UE is determined. In some aspects of the disclosure, the characteristic of the RAL may be determined by the UE, but as described above, the characteristic may alternatively be determined by the relay and forwarded to the UE. In other aspects of the disclosure, both the relay and the UE may determine suitable characteristics of the RAL, and either the relay or the UE may make a comparison of the two characteristics for an improved determination. The characteristic of the RAL may be a measurement of a quality of the RAL, e.g., a signal power, a signal to noise and interference ratio, or any suitable characteristic of the RAL to be utilized to determine an event report.

In block 912, the bias β is incorporated into the consideration of the triggering of a measurement report based on the RAL characteristic determined in block 904. That is, the consideration of the event depends at least in part on the characteristic of the RAL and the characteristic of the BHL. Here, the consideration may include comparing the characteristic of the RAL with a characteristic of the DAL between the donor base station and the UE, e.g., to determine which base station (i.e., the relay or the donor base station) is preferable to be a serving cell. The comparing of the RAL and the DAL may be made by determining the inequality $$M_{UE}^{DAL} + CIO^M + H \overset{?}{\lessgtr} M_{UE}^{RAL} + CIO^R,$$

where $M_{UE}^{DAL}$ is a measurement value of the DAL by the UE, $CIO^M$ is a cell individual offset for offsetting $M_{UE}^{DAL}$, H is a hysteresis value, $M_{UE}^{RAL}$ is a measurement value of the RAL by the UE, and $CIO^R$ is a cell individual offset for offsetting $M_{UE}^{RAL}$. Further, at least one of $CIO^M$ or $CIO^R$ may correspond at least in part to the characteristic of the BHL.

In block 914, the UE may provide the event report relating to the handoff to the relay. Here, the event report incorporates the biased measurement utilizing the bias β, such that it depends at least in part on the characteristic of the RAL and the characteristic of the BHL.

Figure 10:
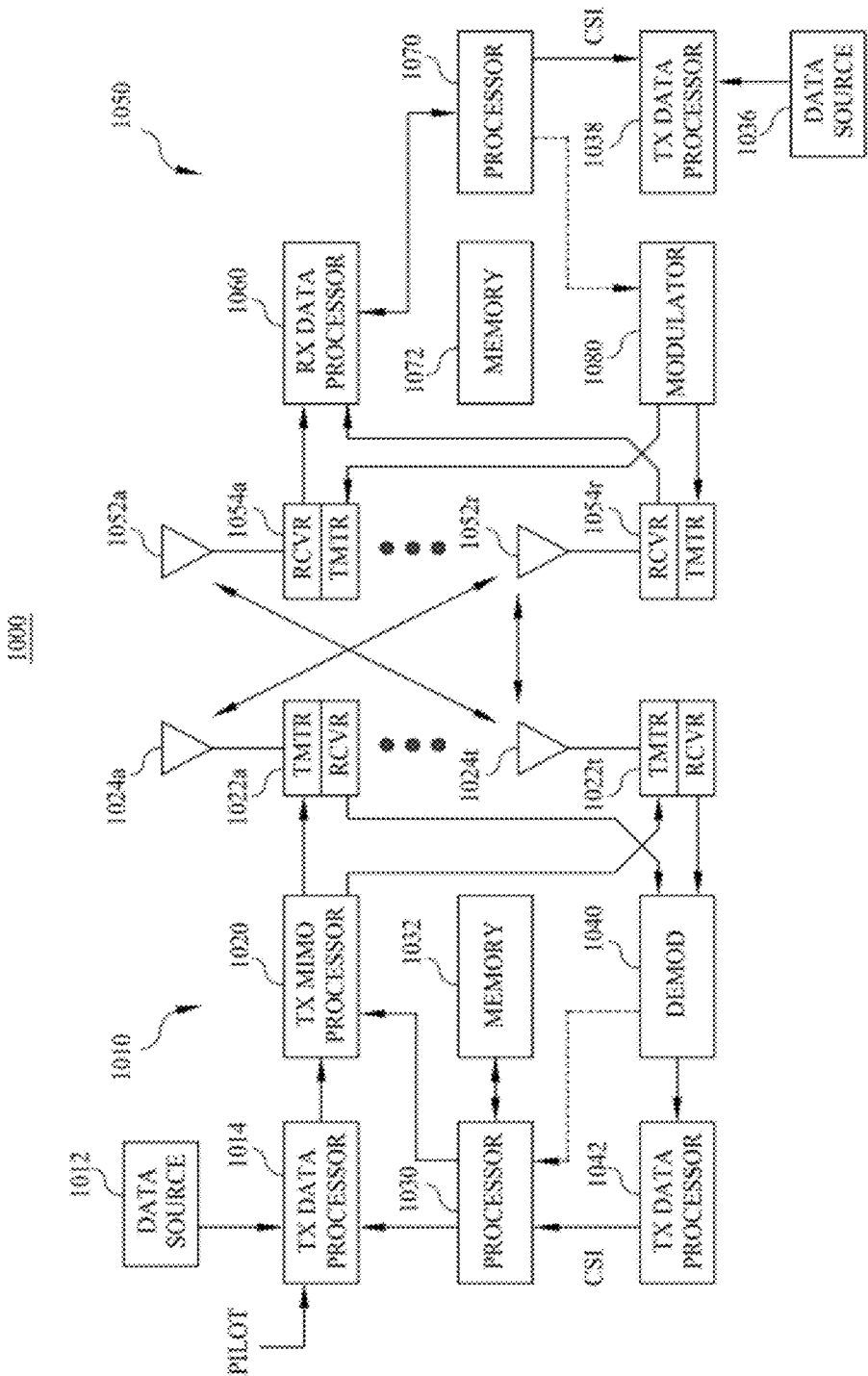
FIG. 10 is a block diagram illustrating certain components of a UE and a network node such as a relay or base station in accordance with some aspects of the disclosure.

FIG. 10 shows an example wireless communication system 1000. The wireless communication system 1000 depicts one network node 1010 and one mobile device 1050 for sake of brevity. However, it is to be appreciated that system 1000 can include more than one network node and/or more than one mobile device, wherein additional network nodes and/or mobile devices can be substantially similar or different from example network node 1010 and mobile device 1050 described below. Moreover, the various components illustrated in the network node 1010, and the network node 1010 itself, may refer to a relay, a donor base station, or a disparate base station, as described above. In the case that the network node 1010 is a relay, then the relay 1010 includes additional components, not illustrated, that are similar to the illustrated components, for a backhaul link with another relay and/or a donor base station. In addition, it is to be appreciated that network node 1010 and/or mobile device 1050 can employ the systems (FIGS. 1-6) and/or methods (FIGS. 8-9) described herein to facilitate wireless communication therebetween.

At network node 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides NT modulation symbol streams to NT transmitters (TMTR) 1022a through 1022t. In various aspects, TX MIMO processor 1020 may apply beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1022a through 1022t are transmitted from NT antennas 1024a through 1024t, respectively.

At mobile device 1050, the transmitted modulated signals are received by NR antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the NR received symbol streams from NR receivers 1054 based on a particular receiver processing technique to provide NT "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at network node 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1022a through 1022t, and transmitted back to network node 1010.

At network node 1010, the modulated signals from mobile device 1050 are received by antennas 1052, conditioned by receivers 1054, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at network node 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In one configuration, the apparatus 1010 for wireless communication may include means for establishing a backhaul link between a relay and a donor base station; means for providing from the relay to a UE information relating to a characteristic of the backhaul link; means for directly transmitting the information from the relay to the UE over a relay access link between the relay and the UE; means for transmitting the information from the relay to the donor base station over the backhaul link, to be provided to the UE over a direct access link between the donor base station and the UE; means for sending the information from the relay to a network node to be provided to the UE over a link between the network node and the UE; means for determining the backhaul link quality by measuring, by the relay, a power of the backhaul link; means for determining a quality of the backhaul link between the relay and the donor base station, wherein the characteristic of the backhaul link corresponds at least in part to the quality of the backhaul link; means for adapting the bias such that a UE report of a relay access link in accordance with the bias is shifted to correspond to the quality of the backhaul link; means for adapting the bias such that a handoff event is triggered when the quality of the backhaul link corresponds to a quality of the relay access link determined by the measurement of the relay access link; means for requesting the UE to measure a characteristic of a direct access link between the donor base station and the UE; means for providing at least one of a measurement trigger or a measurement report request from the relay to the UE; and/or means for adjusting a pilot transmission power of the relay access link in accordance with the characteristic of the backhaul link. In one aspect, the aforementioned means may be the processor(s) 1014, 1020, 1030, and/or 1042 illustrated in FIG. 10 and configured to perform the functions recited by the aforementioned means. In another aspect, the aforementioned means may be a module or any apparatus configured to perform the functions recited by the aforementioned means.

In another configuration, the apparatus 1050 for wireless communication may include means for determining a characteristic of a relay access link between a relay and a UE; means for receiving information relating to a characteristic of a backhaul link between the relay and a donor base station; means for providing an event report relating to a handoff to or from the relay, wherein the event report depends at least in part on the characteristic of the relay access link and the characteristic of the backhaul link; means for measuring the relay access link utilizing the UE; means for measuring a characteristic of a direct access link with a first base station; means for comparing the characteristic of the direct access link with the characteristic of the relay access link to determine the event report; means for determining the inequality $$M_{UE}^{DAL} + CIO^M + H \overset{?}{<>} M_{UE}^{RAL} + CIO^R;$$

means for applying the bias to a measurement of an access link between the UE and at least one of the relay, the donor base station, or a disparate base station other than the donor base station; means for receiving a request to measure a characteristic of a direct access link between the UE and the donor base station; means for providing information relating to the characteristic of the direct access link to the relay; means for measuring a pilot signal strength of a transmission from the relay; and/or means for receiving information relating to the characteristic of the relay access link from the relay. In one aspect, the aforementioned means may be the processor(s) 1070, 1060, and/or 1038 illustrated in FIG. 10 and configured to perform the functions recited by the aforementioned means. In another aspect, the aforementioned means may be a module or any apparatus configured to perform the functions recited by the aforementioned means.

Several aspects of a telecommunications system have been presented with reference to UTRA and E-UTRA systems. As those skilled in the art will readily appreciate, various aspects described throughout this disclosure may be extended to other telecommunication systems, network architectures and communication standards.

By way of example, various aspects of the disclosure may be extended to other wireless communications standards and air interfaces such as W-CDMA, TD-CDMA, TD-SCDMA, High Speed Downlink Packet Access (HSDPA), High Speed Uplink Packet Access (HSUPA), and High Speed Packet Access Plus (HSPA+). Various aspects may also be extended to systems employing Long Term Evolution (LTE) (in FDD, TDD, or both modes), LTE-Advanced (LTE-A) (in FDD, TDD, or both modes), cdma2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

Figure 11:
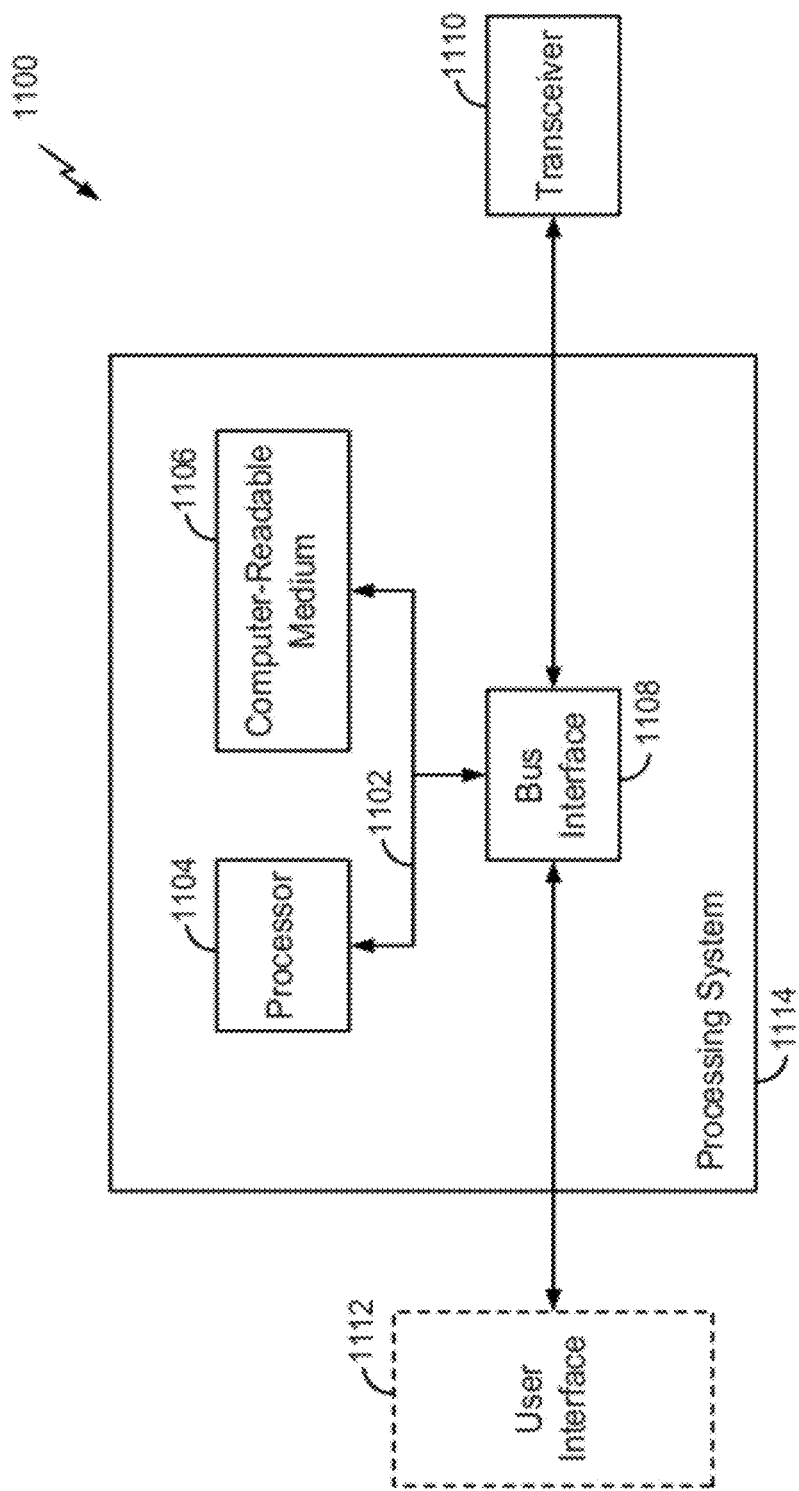
FIG. 11 is a block diagram illustrating an example of a hardware implementation for an apparatus employing a processing system.

FIG. 11 is a block diagram illustrating an example of a hardware implementation for an apparatus 1100 employing a processing system 1114. In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors, represented generally by the processor 1104, and computer-readable media, represented generally by the computer-readable medium 1106. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described infra for any particular apparatus. The computer-readable medium 1106 may also be used for storing data that is manipulated by the processor 1104 when executing software.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
    establishing a backhaul link between a relay and a donor base station; and
    providing from the relay to a UE information relating to a characteristic of the backhaul link, wherein the information relating to the characteristic of the backhaul link comprises at least a bias representing an offset to be applied to a measurement of an access link between the UE and at least one of the relay, the donor base station, or a second base station other than the donor base station, and wherein the bias is adapted to be utilized by the UE when the UE considers whether to provide an event report based on a measurement of a relay access link between the relay and the UE;
    receiving the event report; and
    determining whether to perform handoff of the UE based at least in part on the event report.

2. The method of claim 1, wherein the providing of the information comprises directly transmitting the information from the relay to the UE over a relay access link between the relay and the UE.

3. The method of claim 1, wherein the providing of the information comprises transmitting the information from the relay to the donor base station over the backhaul link, to be provided to the UE over a direct access link between the donor base station and the UE.

4. The method of claim 1, wherein the providing of the information comprises sending the information from the relay to a network node to be provided to the UE over a link between the network node and the UE.

5. The method of claim 4, wherein the link between the network node and the UE comprises a downlink between a disparate base station other than the donor base station, and the UE.

6. The method of claim 1, wherein the bias is provided as a cell individual offset (CIO).

7. The method of claim 1, wherein the characteristic of the backhaul link further comprises a backhaul link geometry $G_R^{BHL}$.

8. The method of claim 7, wherein $G_R^{BHL}$ comprises a ratio of a power spectral density of a transmission from the donor base station over a power spectral density of interference from neighboring cells.

9. The method of claim 1, wherein the bias depends in part on a difference between a backhaul link quality and a reference quality.

10. The method of claim 9, further comprising:
    determining the backhaul link quality by measuring, by the relay, a power of the backhaul link,
    wherein the reference quality comprises a pilot power overhead on the donor base station.

11. A method of wireless communication, comprising:
    determining a characteristic of a relay access link between a relay and a UE;
    receiving information relating to a characteristic of a backhaul link between the relay and a donor base station, wherein the information relating to the characteristic of the backhaul link comprises at least a bias representing an offset to be applied to a measurement of an access link between the UE and at least one of the relay, the donor base station, or a second base station other than the donor base station and wherein the bias is adapted to be utilized by the UE when the UE considers whether to provide an event report based on a measurement of a relay access link between the relay and the UE; and
    providing the event report relating to a handoff to or from the relay.

12. The method of claim 11, wherein the determining of the characteristic of the relay access link comprises measuring the relay access link utilizing the UE.

13. The method of claim 11, further comprising:
    measuring a characteristic of a direct access link with a first base station; and
    comparing the characteristic of the direct access link with the characteristic of the relay access link to determine the event report.

14. The method of claim 13, wherein the first base station is the donor base station serving the relay.

15. The method of claim 13, wherein the first base station is a disparate base station other than the donor base station serving the relay.

16. The method of claim 13, wherein the comparing comprises determining the inequality:

$$M_{UE}^{DAL} + CIO^M + H \stackrel{?}{<>} M_{UE}^{RAL} + CIO^R,$$

wherein:
    $M_{UE}^{DAL}$ comprises a measurement value of the direct access link by the UE,
    $CIO^M$ comprises a cell individual offset for offsetting $M_{UE}^{DAL}$,
    H comprises a hysteresis value,
    $M_{UE}^{RAL}$ comprises a measurement value of the relay access link by the UE, and
    $CIO^R$ comprises a cell individual offset for offsetting $M_{UE}^{RAL}$, and wherein at least one of $CIO^M$ or $CIO^R$ corresponds at least in part to the characteristic of the backhaul link.

17. An apparatus for wireless communication, comprising:
    means for establishing a backhaul link between a relay and a donor base station; and
    means for providing from the relay to a UE information relating to a characteristic of the backhaul link, wherein the information relating to the characteristic of the backhaul link comprises at least a bias representing an offset to be applied to a measurement of an access link between the UE and at least one of the relay, the donor base station, or a second base station other than the donor base station and wherein the bias is adapted to be utilized by the UE when the UE considers whether to provide an event report based on a measurement of a relay access link between the relay and the UE;
    means for receiving the event report; and
    means for determining whether to perform handoff of the UE based at least in part on the event report.

* * * * *